United States Patent
Chua et al.

(10) Patent No.: US 9,638,787 B2
(45) Date of Patent: May 2, 2017

(54) COMPUTER-IMPLEMENTED SYSTEM AND METHOD FOR TRACKING OBJECTS VIA IDENTIFIER-TRACKER PAIRINGS

(71) Applicant: Palo Alto Research Center Incorporated, Palo Alto, CA (US)

(72) Inventors: Christopher L. Chua, San Jose, CA (US); Ashish V. Pattekar, Cupertino, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 414 days.

(21) Appl. No.: 14/262,638

(22) Filed: Apr. 25, 2014

(65) Prior Publication Data

US 2015/0309156 A1 Oct. 29, 2015

(51) Int. Cl.

| | | |
|---|---|---|
| *G01S 3/02* | (2006.01) | |
| *G01S 5/14* | (2006.01) | |
| *G06K 7/10* | (2006.01) | |
| *G06K 19/06* | (2006.01) | |
| *G06K 19/07* | (2006.01) | |
| *G06K 19/08* | (2006.01) | |
| *G08G 1/14* | (2006.01) | |
| *G08G 1/123* | (2006.01) | |

(52) U.S. Cl.
CPC ............ *G01S 5/14* (2013.01); *G06K 7/10009* (2013.01); *G06K 19/06037* (2013.01); *G06K 19/0723* (2013.01); *G06K 19/08* (2013.01); *G08G 1/123* (2013.01); *G08G 1/145* (2013.01); *G08G 1/146* (2013.01)

(58) Field of Classification Search
CPC ......... G01S 3/02; G01S 5/14; G06K 7/10009; G06K 19/06037; G06K 19/0723; G06K 19/08; G08G 1/145
USPC ........................................................ 342/451
See application file for complete search history.

(56) References Cited

U.S. PATENT DOCUMENTS

| | | | | |
|---|---|---|---|---|
| 2010/0156599 | A1* | 6/2010 | Ainsbury | G01S 5/0278 340/10.1 |
| 2010/0213260 | A1* | 8/2010 | Wen | G07B 15/00 235/486 |
| 2012/0256730 | A1* | 10/2012 | Scott | G01S 5/0221 340/10.1 |
| 2014/0028447 | A1* | 1/2014 | Howard | G06Q 10/087 340/10.6 |

(Continued)

FOREIGN PATENT DOCUMENTS

KR 20090040644 A * 4/2009

*Primary Examiner* — Harry Liu
(74) *Attorney, Agent, or Firm* — Patrick J. S. Inouye; Krista A. Wittman

(57) ABSTRACT

A computer-implemented system and method for tracking objects via identifier-tracker pairings is provided. Pairs of associated identifiers and trackers are stored. One of the identifier-tracker pairs is provided to a user, wherein the user associates the tracker with a physical object. The identifier from the provided pair is received and the tracker associated with the received identifier is obtained. A location of the tracker is determined. Readers are monitored within a defined area. A plurality of readings including the tracker is obtained from the readers. A location of the identified tracker is determined based on the readings from a plurality of the readers and a location of the physical object is determined based on the location of the identified tracker.

20 Claims, 11 Drawing Sheets

(56) References Cited

U.S. PATENT DOCUMENTS

| | | | |
|---|---|---|---|
| 2014/0074667 A1* | 3/2014 | Smith | G01S 5/12 705/28 |
| 2014/0077973 A1* | 3/2014 | Lai | G08G 1/143 340/932.2 |
| 2014/0095219 A1* | 4/2014 | Zises | G06Q 10/02 705/5 |
| 2015/0066545 A1* | 3/2015 | Kotecha | G06Q 10/02 705/5 |
| 2015/0324777 A1* | 11/2015 | Moshal | G06F 17/30879 705/44 |

* cited by examiner

COMPUTER-IMPLEMENTED SYSTEM AND METHOD FOR TRACKING OBJECTS VIA IDENTIFIER-TRACKER PAIRINGS

FIELD

This application relates in general to tracking objects and, in particular, to a computer-implemented system and method for tracking objects via identifier-tracker pairings.

BACKGROUND

Lack of available parking spaces has become problematic in many densely populated areas. To alleviate the problem and provide adequate parking, large multi-story parking structures, such as parking garages, are being built because they require the least amount of land while maximizing the number of parking spaces. Parking garages are commonly located in metropolitan areas, airports, office buildings, and apartments, as well as in any other area where large amounts of parking are needed. The parking garages generally include multiple levels of parking, which are similarly configured, making the levels difficult to distinguish.

Due to the similar layouts and the typically large size of the garages, locating a parked vehicle can be time consuming and frustrating, as drivers may forget where they parked their car or become disoriented within the garage, which can result in searching for their vehicle on a wrong level even if the driver remembered where s/he parked. The extended amounts of time required for a driver to locate his vehicle and any frustration experienced by the driver can result in decreased revenue for a parking garage owner, as well as contribute to a lack of available parking spaces for new customers. For instance, a frustrated driver may refuse to park in that same garage again the next time parking is required, opting instead for a smaller garage or on-street parking. Additionally, the more time a driver requires to locate his car, the longer other cars may have to wait to park in the garage, thereby increasing traffic congestion and lowering the potential for additional revenue since the last minute of parking time is typically cheaper (lower revenue generation) than the initial parking period in most paid parking facilities. The same issues on locating parked vehicles also exist in large open field parking structures such as those used in amusement parks and transportation hubs.

Conventional parking structures have attempted to solve the problem using the Global Positioning System ("GPS"), Wi-Fi, and cameras. For example, smartphone applications exist that allow a driver to record the GPS location of his parked car via a smartphone. Upon return to the car, the driver can access the recorded GPS location to locate his car. However, such application utilizes GPS, which requires an unobstructed line of sight from the smartphone device to multiple GPS satellites. Thus, GPS is ineffective for use in a multi-tiered parking garage where the GPS signals may be weak or non-existent.

Further, some garages have implemented the use of cameras to identify vehicles that enter and exit the parking structure. Specifically, cameras are positioned at the entrance of the garage and at the exit. Images of vehicle license plates are captured as the vehicles enter or exit the garage, which allow the garage to monitor a number of available parking spaces versus occupied parking spaces based on a number of vehicles identified as being located in the garage. Further monitoring of individual parking spaces exists, such as by placing a camera at every parking space. The images are stored in a database and when a driver wants to locate his vehicle, he can provide his license plate number to identify the location, which is indicated via the location of the camera. However, buying and maintaining large numbers of cameras, one for every parking space or a subset of parking spaces, is expensive.

Therefore, there is a need for assisting drivers to efficiently locate their parked cars in a cost-efficient manner. Preferably, the assistance provided can be incorporated into the current steps a driver takes when parking in a conventional garage.

SUMMARY

Drivers can efficiently locate their parked vehicles using a parking locator system that employs a "smart" ticket having one or more functional sections, including an RFID transponder (tag) section and a paired identification section. In some embodiments, the identification section can be a scannable QR code. In other embodiments, the identification section can be a bar code or a simple printed number. The identification section of the smart ticket identifies the specific RFID tag associated with the ticket, which can be issued to an individual vehicle when entering a parking structure.

The identification section and the RFID tag section can be connected together when issued. Before leaving a parked vehicle, a driver separates the two sections and leaves the RFID tag section on or in the vehicle, such as on the vehicle dashboard or window. The driver keeps the identification section of the ticket when exiting the vehicle. Upon the driver's return, the identification section is used to look up the associated RFID tag. The locator system described in this application then finds the vehicle containing the identified RFID tag and provides the location of the vehicle to the driver.

The locator system includes an array of RFID readers placed in strategically located nodes within the parking structure. The nodes are located so the interrogation range of individual RFID readers overlaps that of neighboring nodes. The location of an identified RFID tag can then be determined by a basic triangulation method, or by correlating the signal strengths of different readers located at different nodes for more precise location identification. RFID readers with tunable ranges could be used to improve accuracy and to reduce the number of needed nodes. In this case, sweeping through the tunable range by modulating the radio frequency (RF) power emitted by an antenna associated with the reader and progressively identifying the tags that come into range could be used to pinpoint the location of specific tags and corresponding vehicles.

A further embodiment provides a computer-implemented system and method for tracking objects via pairings of identification tags. Pairs of associated identifiers and trackers are stored. One of the identifier-tracker pairs is provided to a user, wherein the user associates the tracker with a physical object. The identifier from the provided pair is received and the tracker associated with the received identifier is obtained. A location of the tracker is determined. Readers are monitored within a defined area. A plurality of readings including the tracker is obtained from the readers. A location of the identified tracker is determined based on the readings from a plurality of the readers and a location of the physical object is determined based on the location of the identified tracker.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Locating a parked vehicle can be time consuming and frustrating for drivers that forget where they parked their vehicle or that become disoriented and unable to locate their vehicle despite "remembering" where they parked. Preventing driver frustration and increasing the flow of vehicles entering and exiting a parking structure are important to generate revenue and assist in alleviating problems related to lack of available parking spaces. Therefore, providing drivers with means to quickly locate their parked vehicles upon returning to the parking facility is desirable. A corresponding pairing of identifier and a tracking tag that is provided to the customer upon entry. The tracking tag portion is placed in the vehicle once parked so that the vehicle can be located using a grid of tracking readers distributed in the parking facility. The ID identifier can be retained by the customer for efficiently locating their parked vehicle upon returning to the parking facility.

Other objects can be efficiently tracked using the ID-tracker tag pairings, including a person or thing, such as vehicles, medical equipment, toys, books, or office supplies, as well as any other objects to be tracked. The following discussion will focus on the tracking of vehicles across a collection of vehicle parking spaces, as an example of how tracking objects can be implemented using the pairings.

Figure 1:
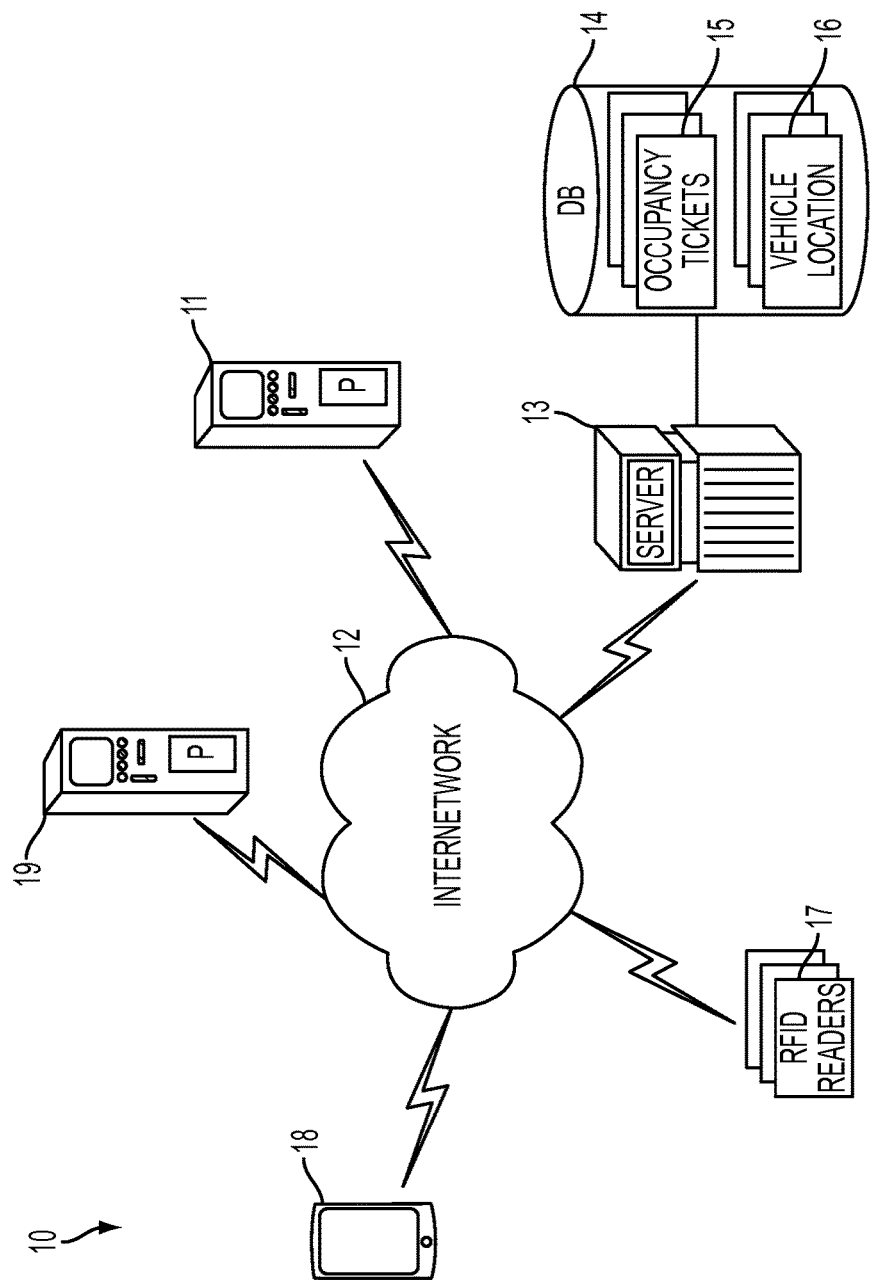
FIG. 1 is a block diagram showing a computer-implemented system for tracking objects via identifier-tracker pairings, in accordance with one embodiment.

Tracking parked cars can efficiently assist drivers in locating their vehicle. FIG. 1 is a block diagram showing a computer-implemented system 10 for tracking objects via identifier-tracker pairings, in accordance with one embodiment. Parking, whether controlled by local government or privately owned, and regardless of whether curbside, on a driveway, in cutouts in front of a driveway, within a parking lot, within a single or multi-story parking structure or garage, or in other physical locations will henceforth be called a "parking facility." A driver can access an occupancy ticket 15 upon entering a collection of parking spaces, such as in a parking facility. A ticket dispenser 11 positioned at the entrance of the parking facility can dispense the occupancy ticket to the driver.

Specifically, the ticket dispenser 11 requests an occupancy ticket code 15 from a parking server 13 interconnected to the dispenser 11 via an internetwork 12, such as the Internet or a local area network (LAN), such as a wired Ethernet or a wireless (WiFi) network. The server 13 accesses requisite identification codes for an occupancy ticket 15 from a database 14 and transmits the occupancy ticket code 15 to the ticket dispenser 11 for dispensing a physical occupancy ticket 110 in order to provide the ticket to the driver.

The occupancy ticket 15 can include an identifier and tracker pairing, which can be provided as a single physical ticket or multiple physical tickets, as well as a combination of physical and virtual tickets. For instance, the identifier and tracker can be provided on a single ticket that can be separated by a perforated divide. Alternatively, the identifier and associated tracker can be dispensed as two separate tickets that together form the occupancy ticket. Further, each portion of the occupancy ticket pairing can be predetermined or can be made on-demand, such as when requested by a driver. The occupancy ticket is further discussed below with reference to FIG. 3.

Once obtained, the driver parks his car in an available parking space and places the tracker portion of the ticket in the car, such as on the dashboard, windshield, or windows, as well as any other place at which the tracker is visible to reader systems positioned throughout the parking facility. Meanwhile, the driver retains the identifier portion for use upon returning to the parking facility.

After returning, the driver locates a parking console 19, which is connected to the server 13 via the internetwork. One or more consoles 19 can be located throughout the parking facility, with at least one console located on every floor or at every row or aisle. In a further embodiment, a single console may be located at an entrance to the parking facility, or near an elevator or stairwell for the parking facility. The driver inserts the identifier portion of the occupancy ticket 15 into the parking console 19, which accesses the database 14 to determine which tracker is associated with the identifier. Upon determination, the identified tracker is used to determine the location of the driver's vehicle based on reader systems 17, which are systematically positioned throughout the parking facility.

Each reader system 17 in the parking facility identifies the trackers within range and provides the identified trackers to the server 13 via the internetwork 12. The readers 17 can search for and identify trackers on a periodic, continual, or as requested basis. The location of each tracker is determined based on the reader systems that identify that tracker. Once determined, the tracker locations are stored in the database 14 for providing to the parking console 19 and thus, the driver. The tracker locations can also be stored in a separate database. In a further embodiment, the tracker location can be determined once the driver scans the identifier via the parking console 19. Determining tracker and vehicle location is further discussed below with reference to FIG. 7.

In a further embodiment, the driver can obtain a location of his parked vehicle using an application on his mobile computing device 18, thereby replacing a need for the parking console. For example, the driver can download the parking application onto his mobile computing device, which can be used to scan the identifier portion of the occupancy ticket using a built-in camera and determine a location of the tracker, and thus, vehicle, by accessing the server to obtain the location corresponding to the scanned identifier portion of the occupancy ticket. The mobile computing device 18 can communicate with the server 13 to obtain requested vehicle locations. The mobile computing device can include a cellular telephone, smartphone, tablet, or laptop, as well as other types of mobile computing devices.

Figure 2:
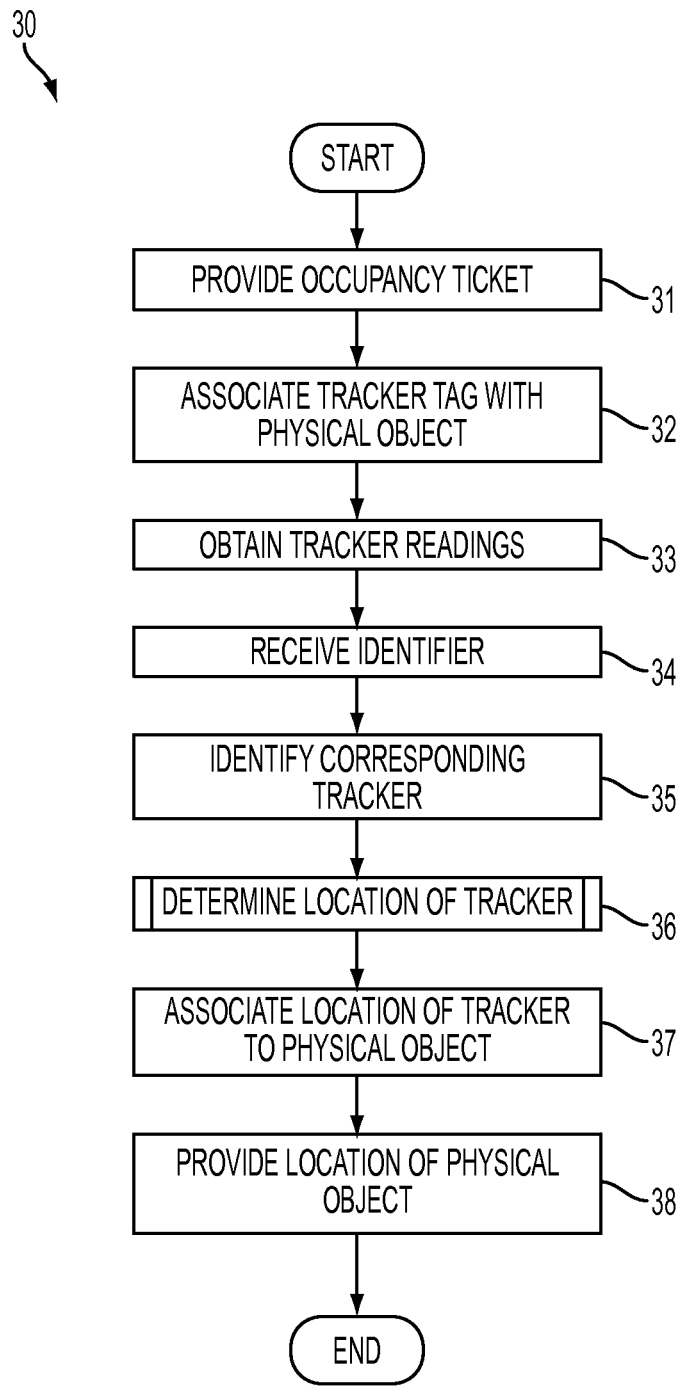
FIG. 2 is a flow diagram showing a method for tracking objects via identifier-tracker pairings, in accordance with one embodiment.
Figure 3:
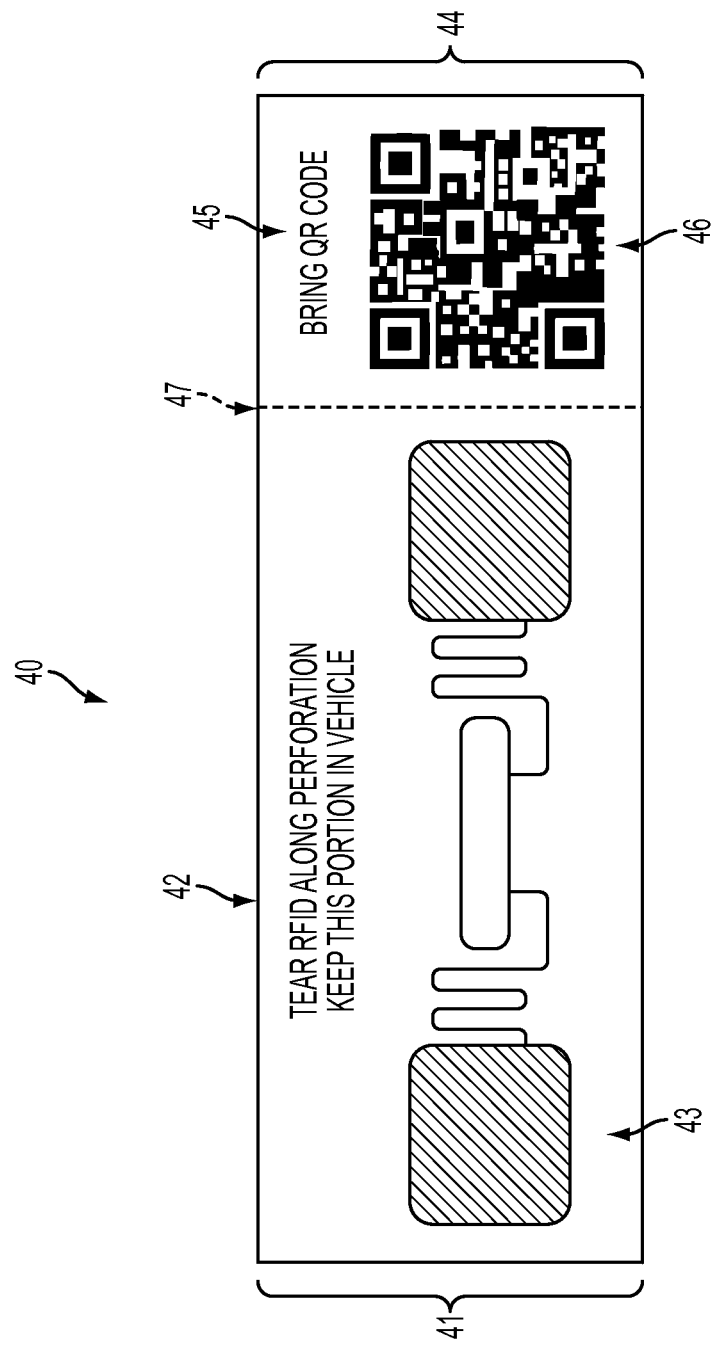
FIG. 3 is a block diagram showing, by way of example, an occupancy ticket.

The determined locations of tracked objects are used to assist a user in finding items that are difficult to locate. FIG. 2 is a flow diagram showing a method 30 for tracking objects via identifier-tracker pairings, in accordance with one embodiment. A driver receives (step 31) an occupancy ticket from a dispenser located at or near an entrance of a parking facility, such as by pushing a button on the dispenser. The occupancy ticket includes at least an identifier and a tracker that together are used to assist the driver in locating his vehicle once parked. FIG. 3 is a schematic diagram showing, by way of example, an occupancy ticket 40. The occupancy ticket is a single ticket that includes two divisible portions, including a tracker portion 41 and an identifier portion 44. The two portions can be divided using a perforated divide 47 that separates the two portions.

The tracker portion 41 can include instructions for handling the tracker and a tracking tag. The tracking tag can include a radio frequency identification ("RFID") tag, as well as other types of tracking tags. At a minimum, the tracking tag should be able to communicate with a reader so that the reader obtains identification information of the tracking tags within a particular range of the reader. When RFID tags are used, the tags can be active or passive. As well, the readers can be passive or active, depending on the type of RFID tags used.

The tracking portion is placed in the vehicle to be tracked. In one embodiment, the trackers can include an adhesive on one side to removably affix to the vehicle. For instance, a top surface of the tracker can include an adhesive to stick to an inside surface of the front windshield or alternatively, the back side of the tracker can include an adhesive to stick to the vehicle dashboard. However, other types of tracking tags, readers, and methods for affixing the trackers are possible. Adhesive-free tags that cling to the windshield or window from inside the vehicle, such as via electrostatic or other means, may also be utilized.

The identifier portion 44 remains with the driver and can include instructions for handling the identifier, and machine- or human-readable data, such as a barcode, QR code, magnetic stripe, serial code, or RFID identifier that is polled by the parking console. Alternatively, the identifier can include a serial number that can be manually entered into the parking console. Other types of readable data are possible, such as images or grids. In a machine-readable implementation, the machine-readable data should be readable by an imaging device, such as a camera, and store data for transfer to the imaging device upon being read.

In a further embodiment, the occupancy ticket can include further portions (not shown), such as an object data portion, which can include identification of the object to be tracked or individual tracking the object. With regards to tracking vehicles, the object data portion can include data regarding the parking facility, a time the driver entered the parking facility, parking cost per time parked, and vehicle make, model, and year. With regards to other types of tracking, the data portion can include information about the object to be tracked, a well as information on the owner of the object to be tracked and potential cost of the object to be tracked or cost of the tracking Other types of data and information are possible.

In yet a further embodiment, the occupancy ticket can include multiple portions that are separately provided. For example, the driver may obtain the identifier from a first dispenser and the tracker from a second dispenser. Alternatively, the identifier and tracker may be dispensed separately from the same dispenser. For instance, the dispenser can have two separate slots, one for dispensing the identifiers and one for dispensing the trackers. Otherwise, the dispenser may first dispense the identifier and then the tracker, or vice versa, via the same slot.

Figure 4:
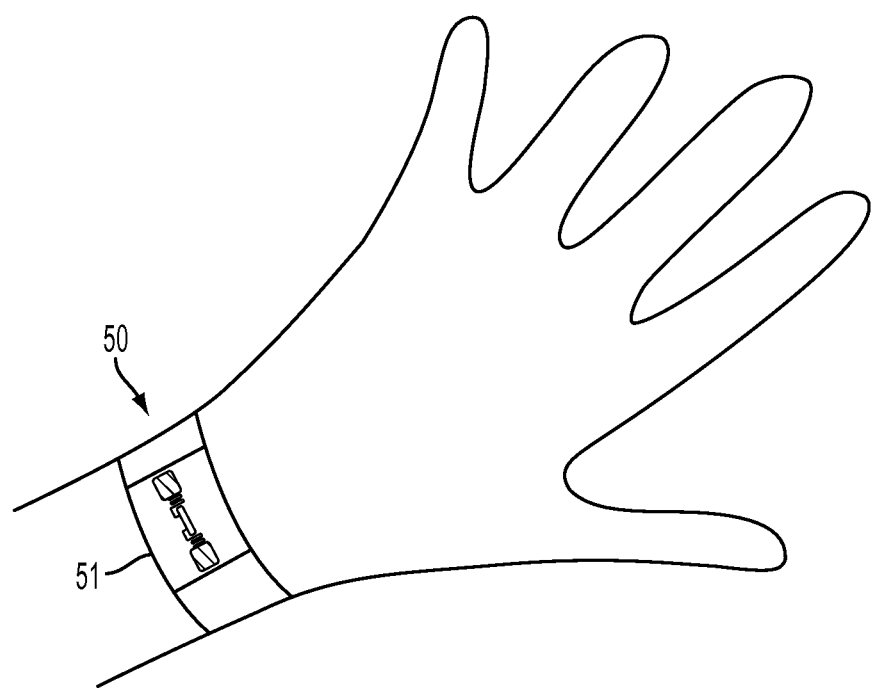
FIG. 4 is a block diagram showing, by way of example, a tracker printed on a wristband.

In a still further embodiment, the tracker can be affixed to an individual via a wristband or necklace. FIG. 4 is a block diagram showing, by way of example, a tracker 50 printed on a wristband 50. The wristband 50 can include bracelets or watches and can be secured around an individual's wrist to track that individual. The tracker 51 can be printed directly on the wristbands 50 or can be removably affixed, such as by adhesive, glue, or rubber. As well, the bracelets can be made from plastic, vinyl, cloth, paper, or other materials, including Tyvek. In one embodiment, the identifier can be removably affixed to one end of the wristband, such as by a perforated divide. In a further embodiment, the identifier is separately provided.

Once the occupancy ticket is obtained, the driver finds an available parking space and parks his vehicle. The driver then associates (step 32) the tracker portion of the occupancy ticket with the vehicle by leaving the tracker in a location in the vehicle such that the tracker is visible to or scannable by reader systems installed in the parking facility, while retaining the identifier portion. Specifically, the tracker can be placed on the front dashboard of the vehicle to remain visible through the front windshield or removably affixed to the front windshield, back windshield, or side windows, as well as any other windows in the vehicle, such as a sun roof.

While the vehicle is parked, the reader systems positioned throughout the parking facility obtain (step 33) readings from the trackers in the parked vehicles. The readings can include identification of one or more trackers and can be obtained on a periodic, continual, or as-requested basis. A triangulation method can be used to identify an approximate location or area in the vicinity of location of the vehicle by identifying overlapping zones of ranges for reader nodes in the system that are able to successfully communicate with the tracker. Alternatively, relative signals from the reader nodes that identify the tracker placed in the vehicle can be used to determine the tracker position, and thus, vehicle location in the parking facility, in a more accurate fashion, which is then stored in a database and provided to the driver upon request. Determining a location of the vehicle is further discussed below in detail with reference to FIGS. 6-10.

To obtain the vehicle location, the driver can scan (block 34) the retained identification portion of the occupancy ticket via a parking console or mobile computing device, which each receive the identifier information for processing. The mobile computing device can be connected to the internetwork via, for example, the mobile internet or any wireless network (WiFi) connection. The parking console, mobile computing device or mobile website server associated with the mobile computing device can then accesses a database to identify (step 35) the corresponding tracker location associated with the identifier and obtain (step 36) the location of the tracker. The location of the tracker is designated (step 37) as the location of the driver's vehicle in which the tracker is placed and is provided (step 38) to the driver. In one embodiment where tracker location polling is initiated on an as-requested basis, the database would not be necessary to obtain the location of the tracker, potentially reducing implementation costs of the system.

Figure 5:
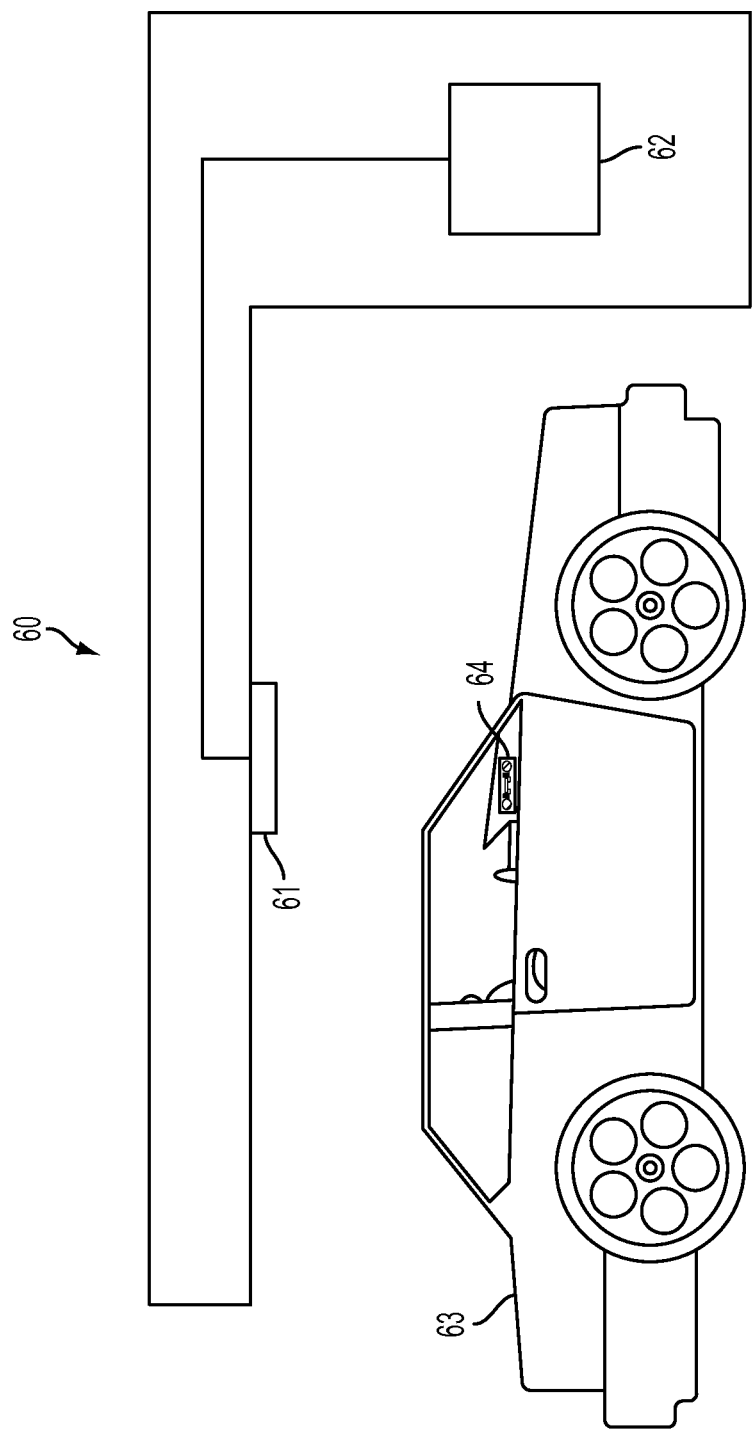
FIG. 5 is a block diagram showing, by way of example, a parking facility with an RFID reader.

To determine the vehicle location, reader systems can be systematically positioned in the parking facility such that a tracker in every parking space is visible to one or more of the reader systems. FIG. 5 is a block diagram showing, by way of example, a parking facility 60 with an RFID reader system. The parking facility 60 can include a plurality of reader systems 61, 62 to identify the trackers 64 and determine a location of each tracker. Each reader system can include one or more antennas 61 and a reader 62. An antenna 61 obtains identification of the trackers within a particular range of the reader system, while the reader 62 processes the identification information. The antenna 61 can be positioned on a ceiling of the parking facility, as well as on a post, wall, or lamp post. Positioning of the trackers, as well as the reader systems should be considered together since a communication path between the antennas and the trackers, within range, is required. In one example, communication between the trackers and reader systems occurs via an unimpeded radio frequency communication. The readers 62 can be placed separately from the antenna, such as within or on a wall of the parking facility, as shown in FIG. 5, or together with the antenna (not shown).

Figure 6:
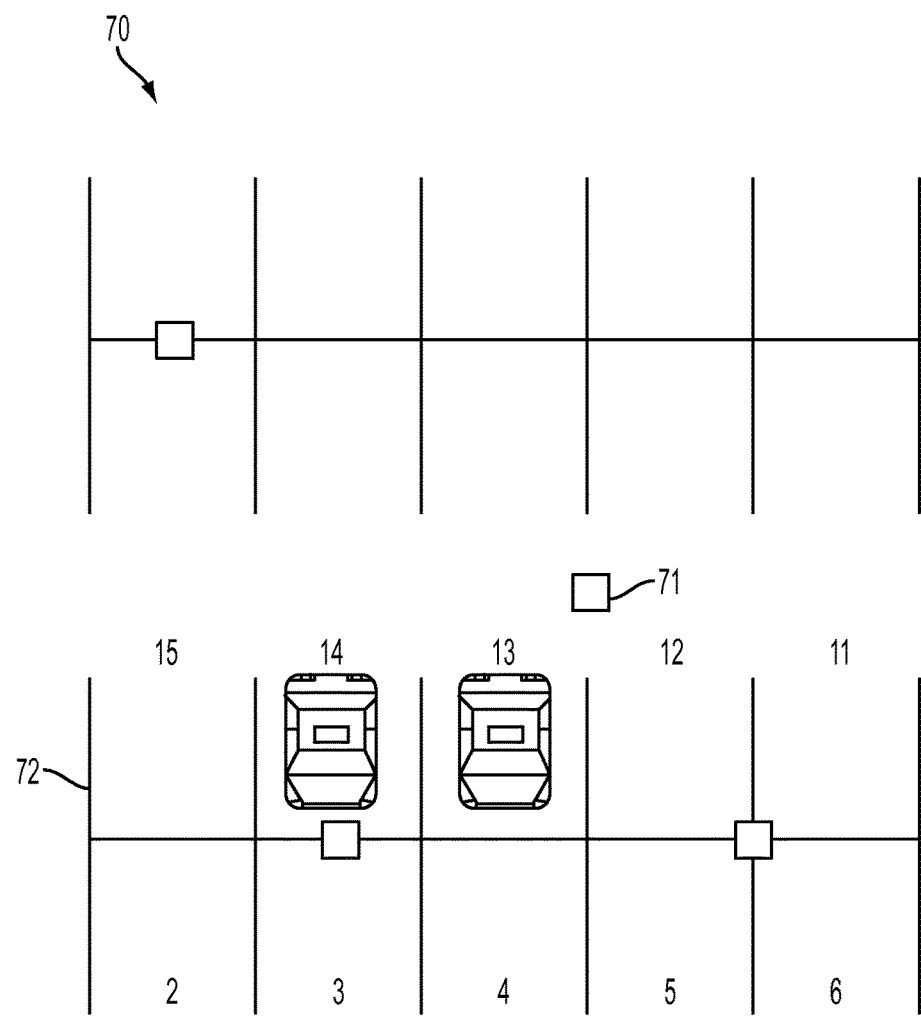
FIG. 6 is a block diagram showing, by way of example, a parking facility with multiple RFID readers.

Placement of the reader systems with respect to other reader systems should also be considered. For instance, a location of a tracker can be based on triangulation. Specifically, the tracker location can be determined based on a plurality of reader systems that identify a common tracker. Based on the location of the reader systems that identify the tracker and a known reading range of the reader systems, a general location of the tracker and vehicle can be determined. FIG. 6 is a block diagram showing, by way of example, a parking structure 70 with multiple readers 71. The readers 71 can be positioned within the parking facility such that each tracker is in view of at least three reader systems; however, other numbers of reader systems are possible. In this example, reader systems are located in relation to parking spaces 72, including between parking spaces 3 and 14, between parking spaces 5, 6, 11, and 12, and between different rows of parking spaces. The reader systems each identify trackers within a predetermined range. The location and range of those reader systems that view a common tracker are then used to determine a location of the tracker. Other methods for determining tracker location are possible and may require a different configuration of the tracker readers.

Figure 7:
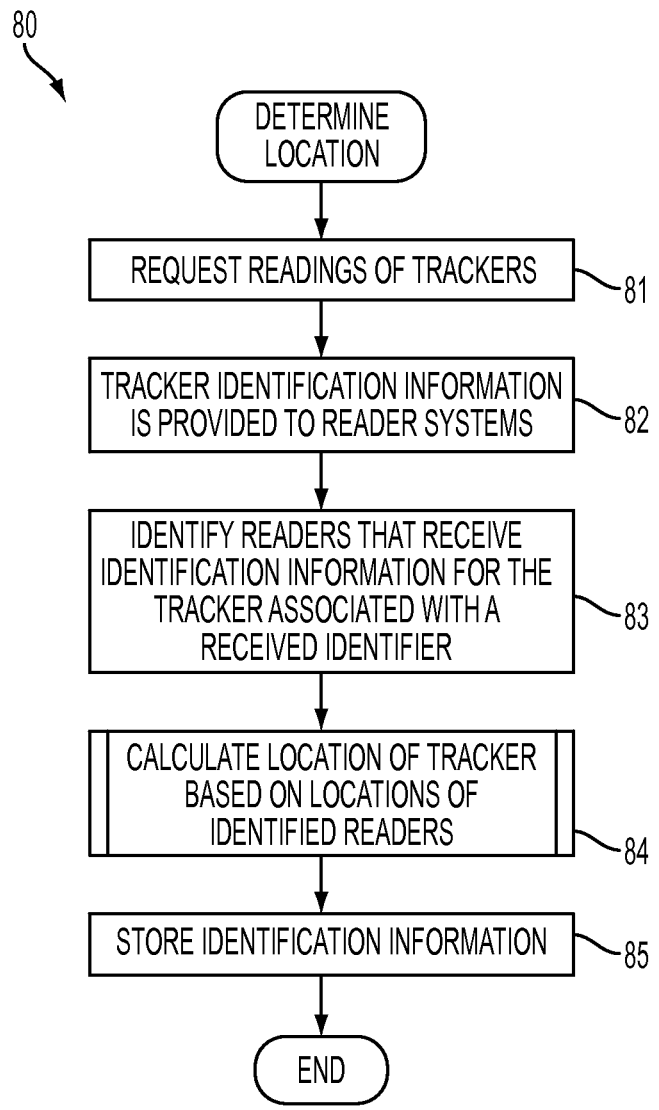
FIG. 7 is a flow diagram showing, by way of example, a process for determining a location of an RFID tag.

Determining the location of a tracker can require identification of the tracker by one or more reader systems. FIG. 7 is a flow diagram showing, by way of example, a process for calculating a location of a tracker using identification information. On a periodic, continuous, or as-requested basis, readings of the trackers are requested (step 81) and tracker identification information is provided (step 82) to reader systems. Those reader systems that receive identification information for a common tracker, such as a tracker associated with an identifier received by a parking console or an application running on a mobile computing device, are identified (step 83). The location of the tracker is calculated (step 84) based on a location of the reader systems that identify the tracker and on an overlap zone determined by the known reading ranges of those reader systems. The determined location is then stored (step 85).

Figure 8:
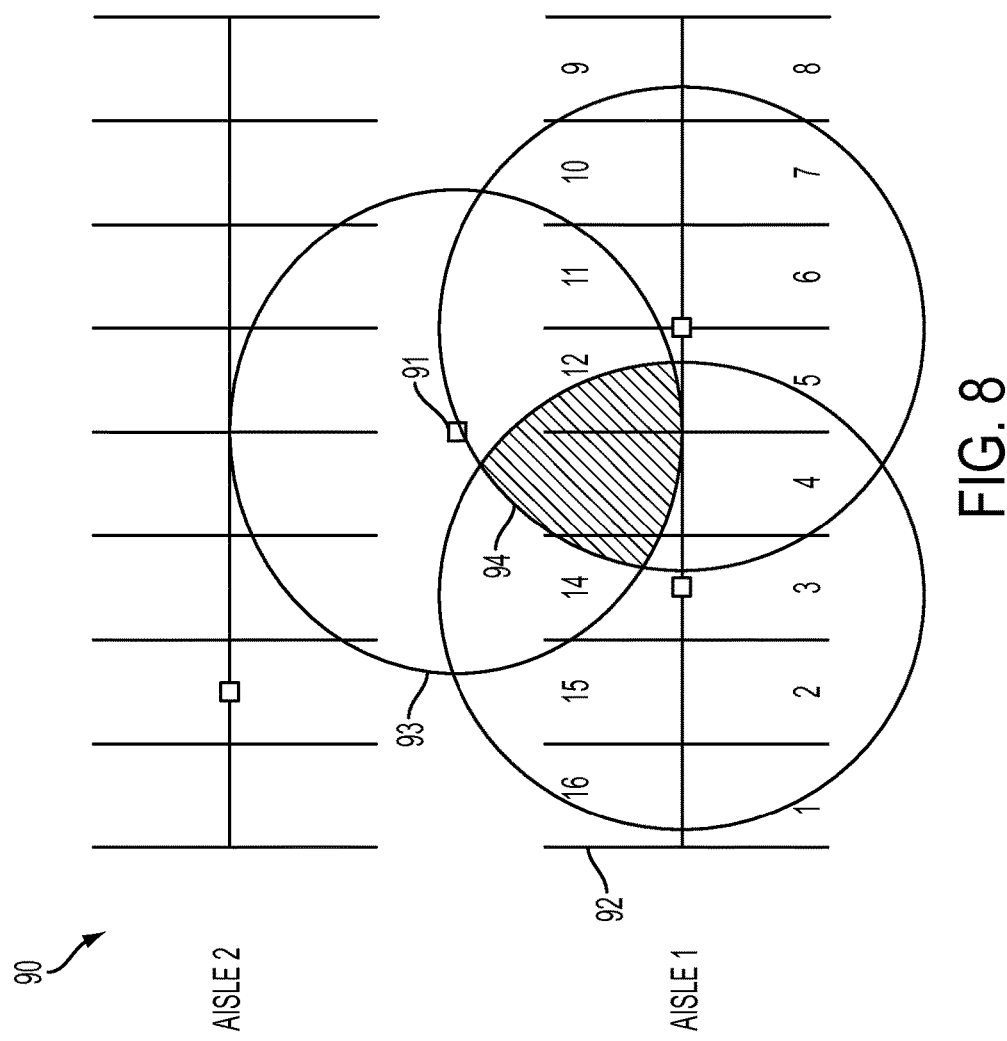
FIG. 8 is a block diagram showing, by way of example, a parking facility with long-range tracker readers.

In one example, the location of a parked vehicle is calculated using at least three reader systems. FIG. 8 is a block diagram showing, by way of example, a parking structure 90 with multiple reader systems 91 identifying a tracker. Reader systems 91 are installed for example, on the ceiling of the parking facility for each floor, in relation to parking spaces 92. Reader systems with a shorter reading range are positioned closer together than reader systems with a longer reading range so that the range of at least three reader systems overlap, which represents identification of a common tracker by each of the overlapping reader systems.

In this specific example, the reader systems are installed between parking spaces 3 and 14, between parking spaces 5, 6, 11, and 12, and between aisle 1 and aisle 2. The identified reader systems only provide an example of identifying a particular tracker located within range of each of the reader systems. Other reader systems positioned throughout the parking facility may be used to identify trackers placed in vehicles parked in other parking spaces. The width of the parking spaces, in this example, is around 8 feet per parking space and a reading range 92 of the reader systems has a radius of around 16 feet. Other parking space widths, reading ranges, and reader system locations are possible. Moreover, as mentioned previously, the reader ranges need not be fixed, but can be varied by modulating the radio frequency power transmitted via the reader antenna, thereby enabling coverage of a larger parking space area using fewer readers.

The reader systems each request readings from the trackers within range of that reader system. The readings can include identification information for trackers located in parked vehicles. For example, each of the reader systems installed between parking spaces 3 and 14, between parking spaces 5, 6, 11, and 12, and between aisle 1 and aisle 2 identify trackers in parking spaces 12, 13, and 14, as indicated by the overlapping area of the reading ranges of the reader systems. Once the trackers are identified, the location for each identified tracker is calculated using the identification information from the reader systems that identified that tracker.

In this example, parking spaces 12, 13, and 14 are identified by each of the three reader systems. Vehicles parked in each of parking spaces 12, 13, and 14 can be identified based on the reader systems that identified the trackers associated with those parked vehicles. The locations can then be provided to a requesting driver who has scanned the identifier corresponding to the tracker. Identifying a vehicle's approximate location, such as by a 2 to 3 space accuracy can be sufficient since the driver can easily visually identify his vehicle. Other numbers of spaces and measures of accuracy are possible.

Figure 9:
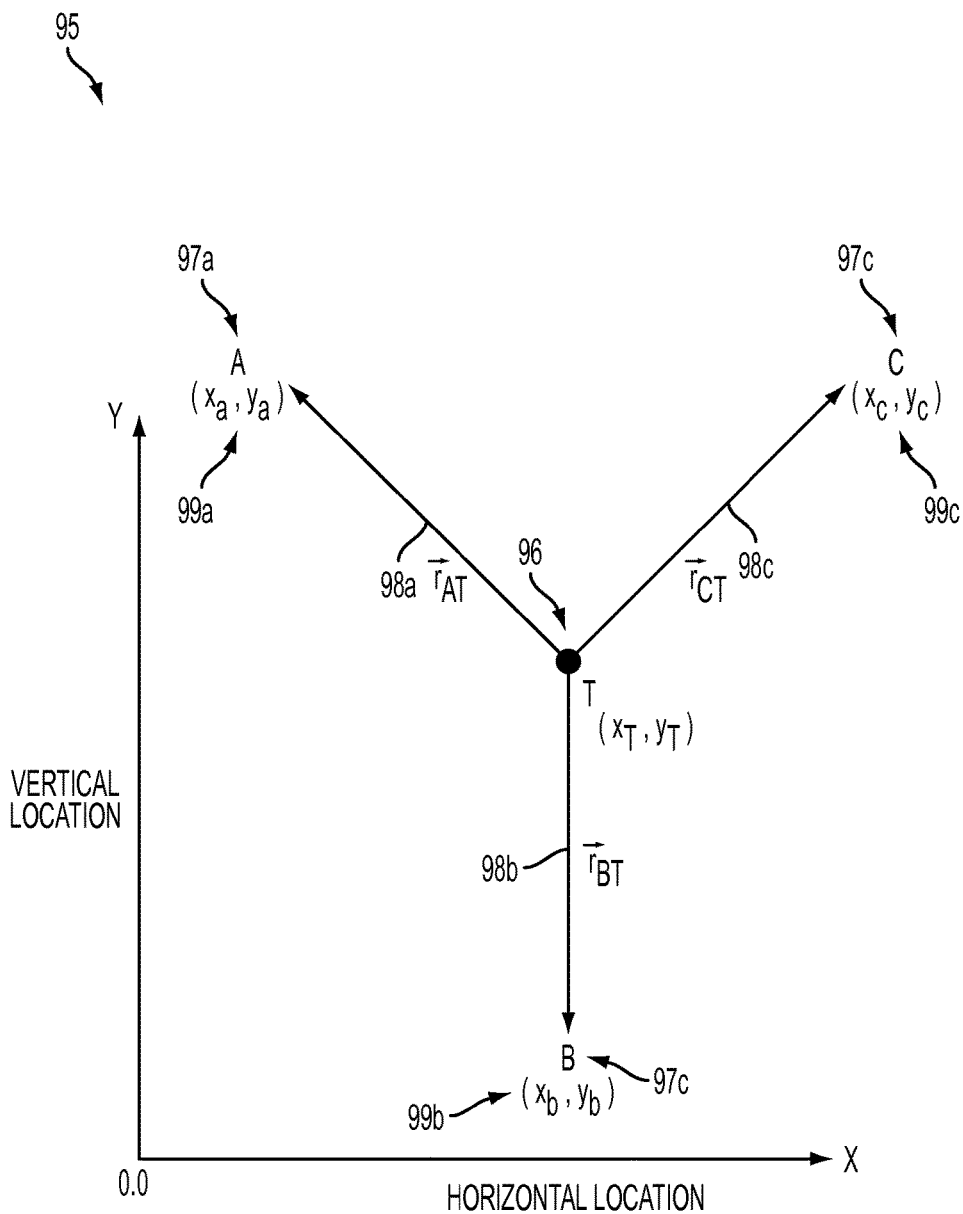
FIG. 9 is a block diagram showing, by way of example, a graph of a tracker within range of three reader systems.

Further, the location of the tracker can be determined using known locations of the reader systems that identify the tracker and a signal strength from the tracker to each of the reader systems. FIG. 9 is a block diagram showing, by way of example, a graph 95 of a tracker 96 within range of three reader systems 97*a-c*. Each of the reader systems A 97*a*, B 97*b* and C 97*c* is associated with a known location coordinate represented by (x,y) 99*a-c*, while a location of a tracker (T) 96 is unknown. However, the location of the tracker 96 can be determined based on the known location coordinates 99*a-c* of the reader systems 97*a-c* that identify the tracker 96 and a distance of each reader system from the tracker. The distances of the reader systems from the tracker can be determined based on signal strength.

Specifically, a vector 98a-c from the tracker 96 to each of the reader systems 97a-c is formed, with a direction of the vector 98a-c extending from the tracker 96 to the respective reader systems 97a-c. Each vector equals the distance between the tracker and the respective reader system. For instance, the vector for reader system A is represented $|\vec{r}_{AT}|$ 98a, the vector for reader system B is represented as $|\vec{r}_{BT}|$ 98b, and the vector for reader system C is represented as $|\vec{r}_{CT}|$ 98c. Prior to calibration, each vector distance can be represented by a signal strength, $S_A$, $S_B$, and $S_C$ of each of the reader systems. Upon calibration, the coordinates of the tracker 96 can be determined using the known distances of each reader system 97a-c from the tracker 96 based on the signal strength and the known coordinates of the reader systems 97a-c using the following equations:

$$Y_T = \frac{(x_A - x_B)[x_c^2 + y_c^2 - x_B^2 - y_B^2 + \beta - \gamma] +}{2[(x_B - x_c)(y_A - y_B) - (x_A - x_B)(y_B - y_c)]} \quad (1)$$

$$X_T = \frac{x_A^2 - x_B^2 - (\alpha - \beta) + (y_A - y_B)(y_A + y_B - 2y_T)}{2(x_A - x_B)} \quad (2)$$

Each of the known distances $|\vec{r}_{AT}|$ 98a, $|\vec{r}_{BT}|$ 128b, $|\vec{r}_{CT}|$ 98c, can be denoted by $\sqrt{\alpha}$, $\sqrt{\beta}$, and $\sqrt{\gamma}$ respectively. Therefore, $\alpha$ is represented by $|\vec{r}_{AT}|^2$, which is a known value based on the signal strength of the tracker to the reader system A, $\beta$ is represented by $|\vec{r}_{BT}|^2$, which is a known value based on the signal strength of the tracker to the reader system B, and $\gamma$ is represented by $|\vec{r}_{CT}|^2$, which is a known value based on the signal strength of the tracker to the reader system C. Meanwhile, the x and y coefficients are known location coordinates for each of the reader systems A 97a, B 97b, and C 97c.

Depending on a number of reader systems that identify a tracker, positions of the reader systems, and ranges of the reader systems, the exact location of a particular tracker, such as by a number or other identifier of the parking space, can be identified. Alternatively, an area where the parked vehicle is located can be provided. The area can be designated by multiple parking space numbers, one of which holds the parked vehicle, or by an area identifier, such as aisle number and section number. For instance, the parking facility may be divided into floor, aisle and section, such as Floor 2, Aisle 1, Green section, which can then be provided to the driver as a location of his car. The specific areas in the parking facility can be identified via a sign or wall that includes the name or other identifier of the areas. Each section can include multiple parking spaces, but should be limited to a reasonable number such that the driver can easily find his vehicle, once directed to the correct area in which his vehicle is parked.

Figure 10:
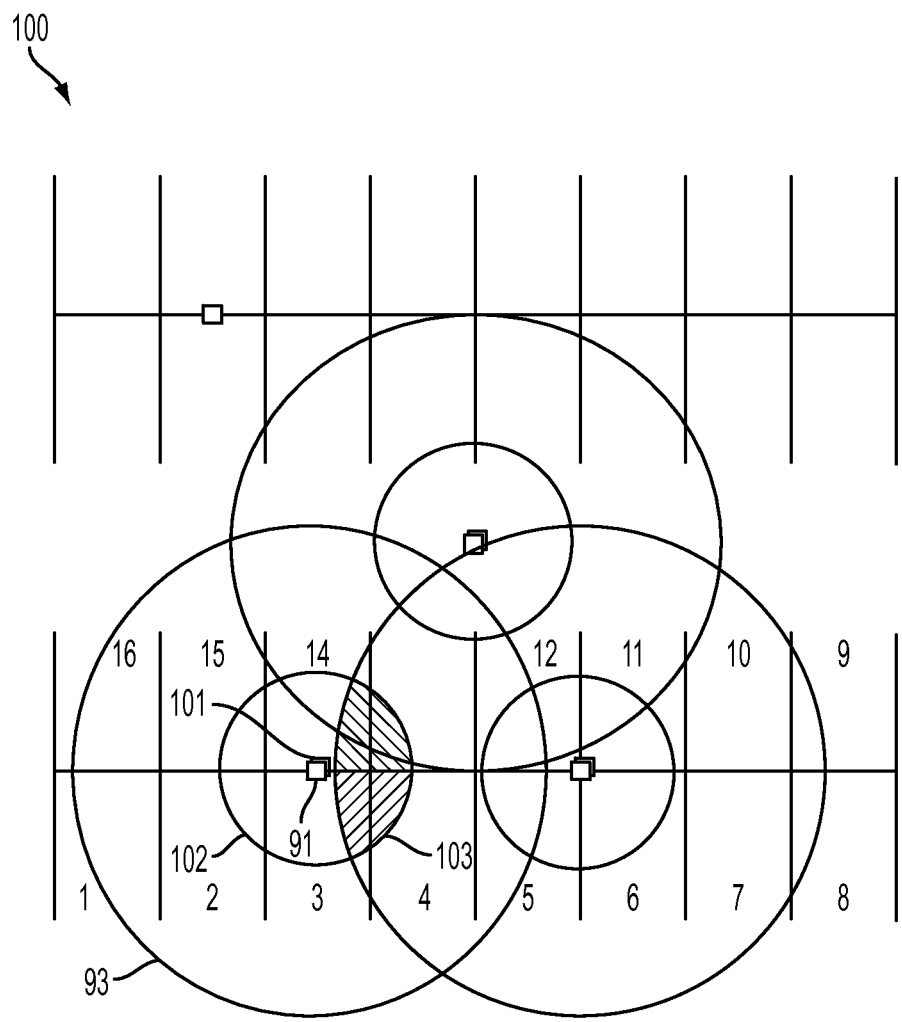
FIG. 10 is a block diagram showing, by way of example, a parking facility with multiple reader systems of various ranges.
Figure 11:
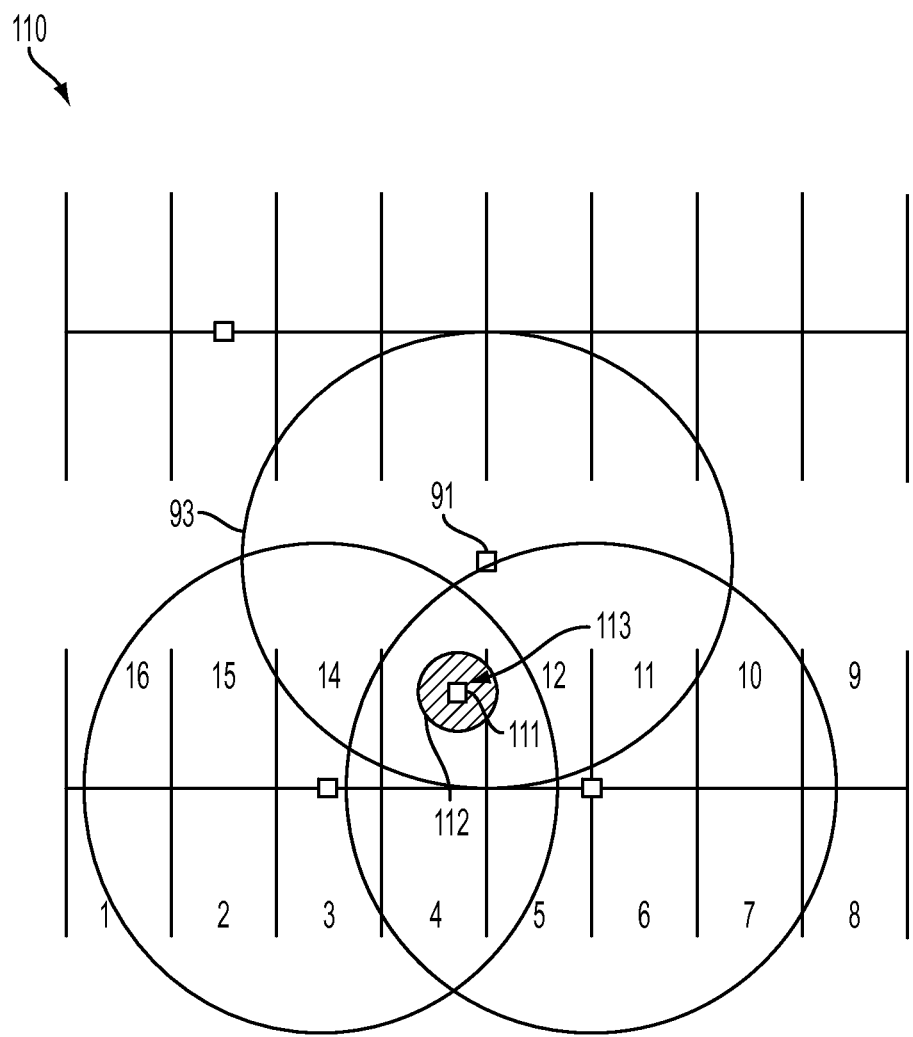
FIG. 11 is a block diagram showing, by way of example, a parking facility with multiple reader systems of various ranges in a further configuration.

Reader systems of various ranges can be used to broaden or refine a location of a parked vehicle. FIG. 10 is a block diagram showing, by way of example, a parking structure 100 with multiple reader systems of various ranges identifying a tracker. Two or more reader systems of varying ranges can be placed together to determine a location of a parked vehicle. For example, a shorter range 102 reader system 101 is positioned adjacent to the reader system 91 between parking spaces 3 and 14, which has a longer reading range. Each of the reader systems between parking spaces 3 and 14, and the long-range reading system between parking spaces 5, 6, 11, and 12 can identify trackers, if available, in parking spaces 3, 4, 13, and 14, as indicated by the overlapping range area 103 of the reader systems. The location of the tracker is determined based on those readers that identify that tracker and can be provided to a driver as a particular parking space number, a plurality of parking space numbers, or an area in the parking garage that includes the parking space in which the vehicle is parked.

Further, the location can be defined using a higher number of reader systems. For example, four reader systems, including the long-range 93 reader systems 91 between parking spaces 3 and 14, between parking spaces 5, 6, 11, and 12, and between aisle 1 and aisle 2, and the short-range reader systems 101 can each identify trackers in parking spaces 13 and 14, if available, which narrows the location that the driver has to look for his vehicle as compared to the location provided by only the long-range reader systems located between parking spaces 3 and 14 and between 5, 6, 11, and 12, and the short-range reader system located between parking spaces 3 and 14.

In a further example, shorter-range reader systems can be interspersed with longer-range reader systems. FIG. 10 is a block diagram showing, by way of example, a parking structure with multiple reader systems of various ranges in a further configuration. For instance, a short-range reader 111 can be located on a ceiling of the parking facility above parking space 13. Use of the short-range reader system in this example, can refine the location results provided by the example discussed above with reference to FIG. 8, which include identification of trackers, if available, in parking spaces 12, 13, and 14. Adding the short-range reader device to the three long-range reader devices described in FIG. 8 narrow the location to parking spaces 13 and possibly, 14, as determined by the overlapping range areas of the four reader systems.

RFID readers with programmable polling ranges provide additional flexibility for electronically reconfiguring the locator system grid without physically relocating the readers. Such dynamic reconfiguration could be used for improving the location accuracy of specific trackers and also to compensate for variations in the signal range caused due to building elements such as walls, structural beams, large metal objects such as fans and air conditioning system enclosures.

In a further embodiment, a single reader system can be positioned within each parking stall and the location of the tracker can be determined via the single reader system associated with the space in which the vehicle is parked. Other configurations of the reader systems are possible.

Although the tracking of objects has been described above with reference to parked vehicles, other objects can be tracked, such as individuals, including children, hospital staff, and patients, or things, including books, office or laboratory equipment, gym equipment, luggage, and toys. For instance, children can be tracked within a shopping mall so that if a parent accidentally becomes separated from her child, the location of the child can be determined, and the parent and child can be reunited. In this example, a ticket having an identifier and a tracker are provided to the parent. The parent retains the identifier and removably affixes the tracker to the child, such as on a wristband or a shirt or hat of the child. Reader systems are positioned throughout the shopping mall and can take readings of trackers within a specified range on a periodic, continuous, or as-requested basis. The location of the tracker is calculated using data regarding the reader systems that identified that tracker and can be stored in a database. If the child becomes separated from the parent, the parent locates a console to scan the identifier. The tracker associated with the identifier is identified and the stored location of the tracker at one or more times can be provided to the parent to track a route of the child. Additionally, a further reading from the reader systems can be requested to identify a current position of the child so that the parent and child will be reunited.

Further, shopping habits of a consumer can be tracked within the shopping mall and can be used for directed advertising. For example, a retailer can affix a tracker to an item purchased by a consumer, while maintaining the identifier. Reader systems positioned throughout the mall can identify the tracker as the consumer moves throughout the shopping mall. Based on locations of the tracker determined using data regarding the reader systems that identified the tracker, a retailer can identify the stores in which the consumer shopped to determine a specific style or preference of that consumer.

Tracking can also be used for staff or equipment within a hospital, as described in further detail in commonly-owned U.S. Patent Application Publication No. 2015/0310,180, filed on Apr. 25, 2014, the disclosure which is hereby incorporated by reference. With respect to the hospital staff, trackers can be assigned to each staff member and affixed to a wristband or badge worn by the staff members. The identifiers can be entered in a database for use by other staff members when a particular staff member needs to be located. For instance, Dr. John is required for an emergency surgery and is not responding to calls over the intercom. The identifier associated with Dr. John's tracker is scanned and a location for Dr. John is provided. As described above with respect to the vehicle tracking, reader systems can be located throughout the hospital facility and are used to identify trackers within a specified range. Those reader systems that identify Dr. John's tracker are determined and subsequently used to determine a location of Dr. John, which is provided to the staff member requesting Dr. John's location. Further, real-time feedback obtained from patients within a medical facility can be combined with location data for the patients or their caregivers to determine an efficiency of the caregivers, as described in further detail in commonly-owned U.S. Patent Application Publication No. 2015/0310,508, filed on Apr. 25, 2014, the disclosure of which is hereby incorporated by reference.

The tracking of hospital staff can also be used to automatically authenticate computer systems after detecting a presence of an authorized staff member so that appropriate data, such as patient data can be displayed when the staff member is present. Additionally, tracking of patients or visitors within the hospital can be provided using the same or different reader systems for the staff tracking.

Timing of the tracker readings can depend of the type of object being tracked. For instance, readings may be collected more often, such as every minute, for individuals who move from location to location, than parked vehicles that do not move, for which readings can occur every five minutes. Other time periods are possible.

In a further embodiment, the tracker can store information regarding the object to be tracked or the individual tracking the item. For instance, with respect to the parking example, a photograph of the vehicle to be parked can be taken as the vehicle enters the parking facility. Image processing can be performed on the photograph to determine a make, model, vehicle year, or license plate, which can be associated with the occupancy ticket. If the driver loses the retained identification portion of the occupancy ticket, the driver can enter the make, model, year, or license plate number of his vehicle to identify the tracker associated with that vehicle and the location of the tracker. Other information can be stored with the occupancy ticket, such as a time the driver entered the garage, which can be used to automatically determine payment due for the time the vehicle was parked in the facility. As well, frequent users of the garage, may associate a bank account or credit card with their vehicles so that the information can be linked to the tracker for automatic payment upon entering or exiting the garage.

In yet a further embodiment, a user can take a photograph of the identifier for later scanning if the user does not want to hold on to the identifier provided by a dispenser. Alternatively, a camera located at the entrance of the parking facility can take a picture of the user and apply facial recognition software and techniques to associate the user directly with the identifier. Then, the user may simply step in front of a console with a camera that can automatically recognize them and display the location of the vehicle.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for tracking physical objects, comprising:
   pairs of associated identifiers and trackers;
   a dispenser to provide one of the identifier-tracker pairs to a user, wherein the user places the tracker with a physical object and to receive from the user the identifier of the provided identifier-tracker pair;
   an identification module to identify the tracker that corresponds to the received identifier from the identifier-tracker pair provided to the user;
   a tracker location determination module to determine a location of the tracker, comprising:
      a monitor module to monitor readers within a defined area;
      a plurality of readings comprising the tracker obtained from the readers; and
      a location calculation module to calculate a location of the tracker based on the readings from a plurality of the readers; and
   an object location determination module to designate the location of the tracker as a location of the physical object on which the tracker is placed.

2. A system according to claim 1, wherein at least three of the readers obtain readings for the tracker.

3. A system according to claim 1, further comprising:
   an interface module to interface a parking console within the area;
   a receipt module to receive the identifier via the parking console; and
   a distribution module to provide the location of the tracker.

4. A system according to claim 1, further comprising:
   an image receipt module to receive an image of the identifier via a mobile computing device; and
   a location distribution module to provide the location of the tracker via the mobile computing device.

5. A system according to claim 1, wherein the readers are positioned within at least one of a parking facility, mall, school, hospital, laboratory, and library.

6. A system according to claim 1, wherein the identifier-tracker pair is provided as at least one of a single ticket and two separate tickets.

7. A system according to claim 1, wherein at least one of the identifier-tracker pairs are one of reusable and disposable.

8. A system according to claim 1, further comprising:
a ticket dispenser to distribute the identifier-tracker pair to the user.

9. A computer-implemented method for tracking physical objects, comprising:
storing pairs of associated identifiers and trackers;
providing one of the identifier-tracker pairs to a user, wherein the user places the tracker with a physical object;
receiving the identifier of the provided identifier-tracker pair from the user;
identifying the tracker that corresponds to the received identifier from the identifier-tracker pair provided to the user;
determining a location of the tracker, comprising:
monitoring readers within a defined area;
obtaining a plurality of readings from the readers comprising the tracker; and
calculating a location of the tracker based on the readings from a plurality of the readers; and
designating the location of the tracker as a location of the physical object on which the tracker is placed.

10. A method according to claim 9, wherein at least three of the readers obtain readings for the tracker.

11. A method according to claim 9, further comprising:
maintaining a parking console within the area;
scanning the identifier via the parking console; and
providing the location of the tracker.

12. A method according to claim 9, further comprising:
receiving an image of the identifier via a mobile computing device; and
providing the location of the tracker via the mobile computing device.

13. A method according to claim 9, wherein the readers are positioned within at least one of a parking facility, mall, school, hospital, laboratory, and library.

14. A method according to claim 9, wherein the identifier-tracker pair is provided as at least one of a single ticket and two separate tickets.

15. A method according to claim 9, wherein at least one of the identifier-tracker pairs are one of reusable and disposable.

16. A method according to claim 9, further comprising:
distributing the identifier-tracker pair to the user.

17. A computer-implemented method for tracking vehicles, comprising:
storing pairs of associated QR codes and RFID tags;
providing one of the pairs of QR codes and RFID tags to a user, wherein the user places the RFID tag with a vehicle parked in a parking facility;
receiving the QR code from the provided pair;
identifying the RFID tag that corresponds to the received QR code from the QR-RFID tag pair provided to the user;
determining a location of the RFID tag, comprising:
monitoring RFID readers within the parking facility;
obtaining a plurality of readings from those RFID readers that identify the RFID tag; and
calculating a location of the RFID tag based on the readings; and
designating the location of the RFID tag as a location of the vehicle on which the RFID tag is placed in the parking facility.

18. A method according to claim 17, further comprising:
providing a ticket dispenser at an entry of the parking facility; and
dispensing the pairs of QR codes and RFID tags via the ticket dispenser.

19. A method according to claim 17, further comprising:
maintaining the RFID readers distributed throughout the parking facility.

20. A method according to claim 17, further comprising:
calculating the location of the RFID tag, comprising:
modulating radio frequency power emitted by an antenna on the RFID reader; and
progressively identifying the RFID tags that come into range to pinpoint the location of those tags.

* * * * *